(12) United States Patent
Upadhyay et al.

(10) Patent No.: US 8,771,390 B2
(45) Date of Patent: Jul. 8, 2014

(54) HIGH POROSITY VITRIFIED SUPERABRASIVE PRODUCTS AND METHOD OF PREPARATION

(75) Inventors: Rachana D. Upadhyay, Shrewsbury, MA (US); Gilles Querel, Woluwe Saint-lambert (FR); Pradyumna Gupta, Holden, MA (US); Richard W. J. Hall, Southborough, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 0 days.

(21) Appl. No.: 13/544,800

(22) Filed: Jul. 9, 2012

(65) Prior Publication Data

US 2013/0008091 A1 Jan. 10, 2013

Related U.S. Application Data

(63) Continuation of application No. 12/387,796, filed on May 7, 2009, now Pat. No. 8,216,326.

(60) Provisional application No. 61/132,808, filed on Jun. 23, 2008.

(51) Int. Cl.
*B24D 3/00* (2006.01)
*B24D 3/34* (2006.01)
*C09K 3/14* (2006.01)

(52) U.S. Cl.
USPC ............... 51/296; 51/293; 51/307; 51/308; 51/309

(58) Field of Classification Search
USPC ............... 51/293, 296, 307, 308, 309
See application file for complete search history.

(56) References Cited

U.S. PATENT DOCUMENTS

| | | |
|---|---|---|
| 3,422,032 A | 1/1969 | Figiel et al. |
| 4,944,773 A | 7/1990 | Rue et al. |
| 4,951,427 A | 8/1990 | St. Pierre |
| 5,129,919 A | 7/1992 | Kalinowski et al. |
| 5,152,810 A * | 10/1992 | Rue et al. ............... 51/309 |
| 5,212,120 A * | 5/1993 | Araujo et al. ............... 501/13 |
| 5,436,063 A | 7/1995 | Follett et al. |
| 5,582,672 A | 12/1996 | Follett et al. |
| 5,738,696 A | 4/1998 | Wu et al. |
| 5,738,697 A | 4/1998 | Wu et al. |
| 5,776,290 A | 7/1998 | Follett et al. |
| 5,834,109 A | 11/1998 | Follett et al. |
| 5,834,569 A | 11/1998 | Ramanath et al. |
| 5,863,308 A | 1/1999 | Qi et al. |
| 5,891,206 A * | 4/1999 | Ellingson ............... 51/309 |
| 6,056,794 A | 5/2000 | Stoetzel et al. |
| 6,074,278 A | 6/2000 | Wu et al. |
| 6,102,789 A | 8/2000 | Ramanath et al. |
| 6,258,136 B1 | 7/2001 | Kinisky et al. |
| 6,348,240 B1 | 2/2002 | Calvert et al. |
| 6,394,888 B1 | 5/2002 | Matsumoto et al. |
| 6,527,854 B1 | 3/2003 | Prelas et al. |
| 6,702,867 B2 | 3/2004 | Carman et al. |
| 6,709,747 B1 | 3/2004 | Gordeev et al. |
| 6,755,729 B2 | 6/2004 | Ramanath et al. |
| 6,770,107 B2 | 8/2004 | Teutsch et al. |
| 6,913,517 B2 | 7/2005 | Prasad |
| 7,008,672 B2 | 3/2006 | Gordeev et al. |
| 7,294,158 B2 | 11/2007 | Welygan et al. |
| 8,216,325 B2 | 7/2012 | Upadhyay |
| 2001/0000838 A1 | 5/2001 | Nagata et al. |
| 2002/0090891 A1 | 7/2002 | Adefris et al. |
| 2002/0173259 A1 | 11/2002 | Drury |
| 2003/0194947 A1 | 10/2003 | Bright et al. |
| 2003/0194954 A1 | 10/2003 | Bonner et al. |
| 2003/0205003 A1 | 11/2003 | Carman et al. |
| 2003/0232586 A1 | 12/2003 | Ramanath et al. |
| 2004/0137834 A1 | 7/2004 | Webb et al. |
| 2004/0166790 A1 | 8/2004 | Balijepalli et al. |
| 2004/0185763 A1 | 9/2004 | Ishizaki et al. |
| 2004/0247873 A1 | 12/2004 | Gordeev et al. |
| 2006/0010780 A1 | 1/2006 | Hall et al. |
| 2006/0135045 A1 | 6/2006 | Bian et al. |
| 2006/0137256 A1 * | 6/2006 | Yui et al. ............... 51/295 |

(Continued)

FOREIGN PATENT DOCUMENTS

| | | |
|---|---|---|
| CN | 1284021 A | 2/2001 |
| CN | 1589189 A | 3/2005 |

(Continued)

OTHER PUBLICATIONS

International Search Report for PCT Application No. PCT/US2009/002821 mailed Dec. 30, 2009.
International Search Report for PCT/US2009/002839 mailed Feb. 1, 2010.
Zhou, Libo et al., "A Novel Fixed Abrasive Process: Chemo-Mechanical Grinding Technology," Int. J. Manufacturing Technology and Management, vol. 7, Nos. 5/6, 2005, Copyright 2005 Inderscience Enterprises Ltd., pp. 441-454.
International Search Report for PCT/US2010/054347 mailed Jul. 26, 2011.

(Continued)

*Primary Examiner* — Elizabeth Wood
(74) *Attorney, Agent, or Firm* — Joseph P. Sullivan; Abel Law Group, LLP

(57) ABSTRACT

A vitrified superabrasive product includes a superabrasive component and a vitrified bond component in which the superabrasive component is dispersed, wherein the vitrified bond component defines pores occupying greater than about 50% of the total volume of the vitrified superabrasive product. The vitrified superabrasive product can be in the form of a grinding tool, such as a grinding wheel. A superabrasive mixture includes a glass powder, a superabrasive grit, a binder and a silicon carbide. The mixture can be in the form of a green body, which is fired under an atmosphere and pressure, and at a temperature sufficient to form a porous vitrified superabrasive product.

13 Claims, 1 Drawing Sheet

(56) References Cited

U.S. PATENT DOCUMENTS

| | | |
|---|---|---|
| 2006/0211342 A1 | 9/2006 | Bonner et al. |
| 2007/0028525 A1 | 2/2007 | Woo et al. |
| 2007/0060023 A1 | 3/2007 | Jeong |
| 2007/0099548 A1 | 5/2007 | Kumar et al. |
| 2007/0261690 A1 | 11/2007 | Jentgens |
| 2008/0066387 A1 | 3/2008 | Bonner et al. |
| 2008/0085660 A1 | 4/2008 | Orlhac |
| 2008/0222967 A1 | 9/2008 | Querel et al. |
| 2009/0093198 A1 | 4/2009 | Subramanian et al. |
| 2009/0218276 A1 | 9/2009 | Linford et al. |
| 2009/0313906 A1 | 12/2009 | Upadhyay et al. |
| 2011/0143641 A1 | 6/2011 | Ramanath et al. |

FOREIGN PATENT DOCUMENTS

| | | |
|---|---|---|
| EP | 0211247 A2 | 2/1987 |
| EP | 0620083 A1 | 10/1994 |
| EP | 0963813 | 12/1999 |
| EP | 1598147 A2 | 11/2005 |
| EP | 1598147 B1 | 3/2008 |
| JP | H3-281174 A | 12/1991 |
| JP | 1996-057768 A | 3/1996 |
| JP | 08-253352 A | 10/1996 |
| JP | 1996-257920 A | 10/1996 |
| JP | H08-257920 A | 10/1996 |
| JP | H11-156725 A | 6/1999 |
| JP | 1999-188647 A | 7/1999 |
| JP | 2000-190232 A | 7/2000 |
| JP | 2000-343438 A | 12/2000 |
| JP | 2003-136410 A | 5/2003 |
| JP | 2003527974 | 9/2003 |
| JP | 2004-034173 A | 2/2004 |
| JP | 2005-522338 A | 7/2005 |
| JP | 2005-319556 A | 11/2005 |
| JP | 2006-334778 A | 12/2006 |
| JP | 2007-181918 A | 7/2007 |
| JP | 2007-196345 A | 8/2007 |
| JP | 2007-290101 A | 11/2007 |
| JP | 2009-061554 A | 3/2009 |
| KR | 20000029592 | 5/2000 |
| KR | 10-0323789 B1 | 2/2002 |
| WO | 95/19871 A1 | 7/1995 |
| WO | 98/04385 A1 | 2/1998 |
| WO | 00/73023 A1 | 12/2000 |
| WO | 03/099518 A1 | 12/2003 |
| WO | 2004/011196 A1 | 2/2004 |
| WO | 2008/117883 A1 | 10/2008 |
| WO | 2009/128982 A2 | 10/2009 |
| WO | 2010/008430 | 1/2010 |
| WO | 2011/056680 A2 | 5/2011 |

OTHER PUBLICATIONS

Technical Search Results, 12 pages, 2009.
International Search Report for PCT/US2010/054329 mailed Jul. 27, 2011.
International Search Report for PCT/US2012/072240 mailed Apr. 25, 2013, 2 pages.

* cited by examiner

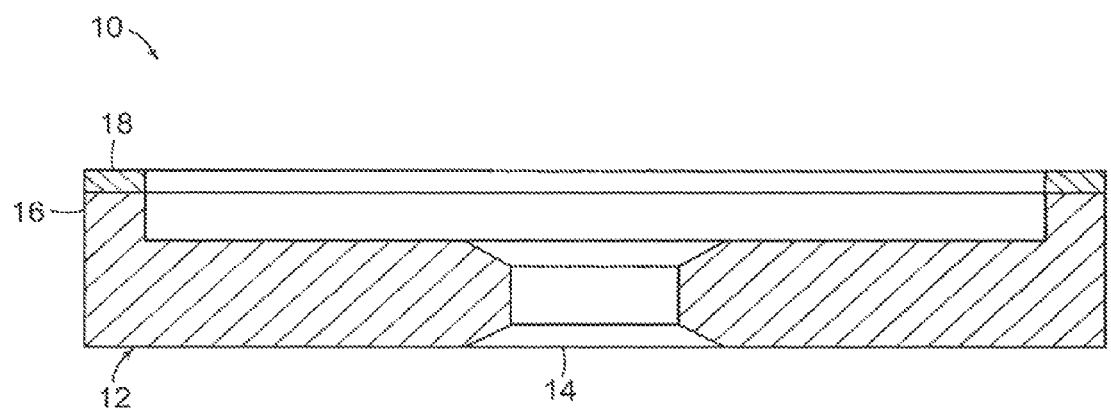

HIGH POROSITY VITRIFIED SUPERABRASIVE PRODUCTS AND METHOD OF PREPARATION

CROSS REFERENCE TO RELATED APPLICATIONS

This application is a continuation of and claims priority to U.S. patent application Ser. No. 12/387,796 filed on May 7, 2009, and entitled "High Porosity Vitrified Superabrasive Products and Method of Preparation," and naming Rachana D. Upadhyay et al. as inventors, which is incorporated by reference herein in its entirety, and which claims priority to U.S. Provisional Patent Application Ser. No. 61/132,808, filed Jun. 23, 2008, which is also incorporated herein by reference in its entirety.

BACKGROUND OF THE INVENTION

Since this world is moving towards thinner and smaller devices, the requirements for thinner wafers (less than 50 microns) is growing. To achieve higher strength of ground silicon wafers, use of smaller grains will be required. During grinding, a decrease in the size of the grain in the composite microstructure will decrease the force required to reduce the effective chip thickness coming out of the wafer. As a result of reduced chip thickness, the strength of the final ground silicon wafers will increase. In addition, new developments in wafer manufacturing technology are moving toward wafers of larger size, thereby causing increasing difficulty in maintaining flatness of a wafer during the grinding process.

Many conventional abrasive tools employed in roughing and finishing these materials include metal-bonded superabrasive. Metal-bonded abrasive tools generally grind fewer parts per hour than glass-bonded tools. Further, metal-bonded abrasive tools can contaminate surfaces of components to be incorporated into electronic devices, thereby severely limiting their use for grinding applications or slicing silicon wafers.

Typically, vitrified bonded tools offer a higher stiffness and low degradation, thereby resulting in better tolerances, flatness in product and an increase number of parts that can be produced per wheel. Although vitrified bonded grinding tools could be employed having a lower grit size, they typically do not have sufficient self-dressing ability due to low porosity or pore structure.

Resin bonds are often exhibit higher wear and have a self-dressing ability. Typically, the relatively low stiffness of resin bonds produces lower surface roughness or a better finish than grinding tools that employ a vitrified bond and grains of similar grit size. However, resin bonds typically can not be used where grit size is lower than 2 microns because the grains are pushed inside of the compliant resin bond during grinding, thereby requiring higher applied pressure and, consequently, causing elevated temperature at the grinding surface. As a result, when particularly applied to larger wafers, maintaining an acceptable flatness of the wafer during grinding becomes more difficult.

A preferred structure for backgrinding will be resin bonded superabrasive wheels. Life of the resin bonded superabrasive wheels is not at all attractive with smaller grains. Therefore, there is a need for a high porosity vitrified superabrasive wheel with finer grains with a self-dressing ability.

SUMMARY OF THE INVENTION

The invention generally relates to a vitrified diamond superabrasive product, and a method of making the vitrified superabrasive product.

The vitrified superabrasive product of the invention includes a superabrasive component and a vitrified bond component in which the superabrasive component is dispersed, wherein the vitrified bond component defines pores occupying greater than about 50% of the total volume at the vitrified superabrasive product.

In another embodiment, the invention is a vitrified superabrasive that includes a vitrified bond component including silica and having a porosity of at least about 50% of the total volume of the vitrified diamond abrasive. A superabrasive component is dispersed in the vitrified bond component. The superabrasive component consists essentially of particles having a number average particle size in a range of between about 0.5 microns and about 60 microns, and wherein the volume ratio of the superabrasive component to the vitrified bond component is in a range of between about 3:2 and about 1:99.

In still another embodiment, the invention is directed to a grinding tool that includes a base and a vitrified superabrasive component at a surface of the base. The vitrified superabrasive component includes a superabrasive component and a vitrified bond component in which the superabrasive component is dispersed. The vitrified bond component defines pores occupying greater than about 50% of the total volume of the vitrified superabrasive component.

In still another embodiment, the invention is a superabrasive mixture, comprising a glass powder, a superabrasive grit, a binder and a silicon carbide. In a specific embodiment, the glass powder includes at least one member selected from the group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO). The superabrasive grit includes diamond particulates having a number average particle size in a range of between about 0.5 microns and about 60 microns, and wherein the volume ratio of the superabrasive grit to glass particles in a range of between about 3:2 and about 1:99. The binder includes at least one member selected from a group consisting of polyethylene glycol, water, a mixture of polyethylene glycol and water, and colloidal silica. Silicon carbide is present in the form of particles having a number average size in a range of between about 0.1 microns and about 20 microns. The silicon carbide is present in the mixture in a range of between about 0.1 and about 5 volume percent of the total amount of glass powder, superabrasive grit, binder and silicon carbide components of the mixture.

In a further embodiment, the invention is directed to a method of forming a vitrified superabrasive, comprising the steps of forming a green body from the mixture of a glass powder, a superabrasive grit, a binder and silicon carbide. The green body is fired under an atmosphere and pressure, and at a temperature, sufficient to cause the silicon carbide to oxidize.

This invention has several advantages. For example, use of silicon carbide as a foaming agent provides relatively high porosity for a vitrified product. The product, therefore, has the advantages of being able to bind superabrasive particles having relatively small size and yet has sufficient porosity to be self-dressing without sacrificing the strength necessary to effectively polish larger silicon wafers. As a consequence, the vitrified superabrasive products of the invention produce relatively low surface roughness and better finish than typically is obtained by vitrified bond abrasive products, while retaining the advantages of vitrified superabrasive tools.

Porosity plays an important role in grinding. Porosity controls the contact area between the work piece and the composite microstructure. Porosity also facilitates movement of coolant around the microstructure to keep the grinding surface temperature as low as possible.

The homogeneity of the structure defined by tight distribution of the pore sizes around mean sizes of pores directly relates to a consistent and steady grinding performance. Much bigger pores than the mean size of pores act as defects and adversely affect the consistency of grinding. Moreover, the aspect ratio provides another measure for the homogeneity of the structure. A value close to 1 indicates high degree of homogeneity. This invention provides a combination of tight distribution of pore sizes, low defect content and an aspect ratio close to 1.

BRIEF DESCRIPTION OF THE DRAWING

The FIGURE is a cross-section of one embodiment of a tool that employs a vitrified superabrasive product of the invention.

DETAILED DESCRIPTION OF THE INVENTION

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention is generally related to vitrified superabrasive products, their precursors, and methods of their manufacture.

"Superabrasive," as that term is employed herein, means abrasives having a hardness, as measured on the Knoop Hardness Scale of at least that of cubic boron nitride (CBN), i.e., a $K_{100}$ of at least 4,700. In addition to cubic boron nitride, other examples of superabrasive materials include natural and synthetic diamond. Suitable diamond or cubic boron nitride materials can be crystalline or polycrystalline. Preferably, the superabrasive material is diamond.

The superabrasive material is in the form of grain, also known as "grit." The superabrasive grain component of the invention can be obtained commercially or can be custom-produced. Generally, the superabrasive employed in the present invention has a number average particle size in a range of between about 0.5 micrometers (microns, μm) and about 60 μm. Preferably, the particle size is in a range of between about 1 μm and about 60 μm. A particularly preferred size is 1-2 μm. "Number average," as that term is employed herein, means the median, or the value where one-half of the particle population is above the value and one-half is below the value.

In one embodiment, the superabrasive grain component is present in an amount of at least about 0.1% by volume of the superabrasive tool. In another embodiment, the superabrasive grain component is present in an amount in a range of between about 1% and about 20% by volume of the superabrasive tool, more preferably between about 2% and about 10% by volume of the superabrasive tool.

In one embodiment, the vitrified superabrasive product of the invention includes a superabrasive component that includes at least one member selected from the group consisting of diamond, cubic boron nitride, zirconia and aluminum oxide.

In one embodiment, the superabrasive component of the vitrified superabrasive product is diamond. In a particularly preferred embodiment, the volume ratio of diamond to vitrified bond component of the vitrified superabrasive is in a range of between about 3:2 and about 1:99.

The vitrified bond component is a suitable vitrified bond component, such as is known in the art. Examples of suitable vitrified bond components include at least one member selected from a group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO).

Typically, the vitrified superabrasive product of the invention as configured at least a component of a grinding tool. An example of a suitable grinding tool is a wheel.

In one preferred embodiment, the vitrified superabrasive product is a fixed abrasive vertical spindle (FAVS). An example of a FAVS, is shown in the FIGURE. As shown in the FIGURE, tool 10 is configured as a wheel having a base 12 about an axis 14. Raised perimeter 16 of wheel supports abrasive segment 18 about the perimeter of base 12. Abrasive segment is one embodiment of a vitrified superabrasive product of the invention. Typically, base will have a diameter in a range of between about six inches and about twelve inches, the height of the abrasive segment will be in a range of between about 2 millimeters (mm) and about 20 millimeters and have a width of between about 2 millimeters and about 10 millimeters Wheels, as described with reference to the FIGURE, are suitable for wafer grinding by rotation about their axis. In a direction counterclockwise to a rotation of the axis of a wafer being ground by the tool. Methods for grinding wafers by use of grinding wheels as generally described with respect to the FIGURE are known in the art.

In another embodiment, the invention is a superabrasive mixture that includes a glass powder, a superabrasive grit, a binder and silicon carbide. In a particularly preferred embodiment the superabrasive grit includes diamond particulate. Generally, the volume ratio of superabrasive grit to glass powder is in a range of between about 3:2 and about 1:99. Examples of suitable glass powder include silicon dioxide ($SiO_2$), boron oxide ($B_2O_3$), aluminum oxide ($Al_2O_3$) and potassium oxide ($K_2O$). Preferred glass powder, or "frits," are those that have relatively low glass transition such as in a range of between about 450° C. and about 800° C.

Examples of suitable binder include polyethylene glycol, water, a mixture of polyethylene glycol and water and colloidal silica.

In one embodiment, the SiC is 1200 grit "37C" SiC from Saint-Gobain Ceramics & Plastics, Inc., Worcester, Mass. Preferably, the silicon carbide is present in the mixture in a range of between about 0.1 and about 5 volume percent of the total amount of glass powder, abrasive grit, binder and silicon carbide components of the mixture.

In one particular preferred embodiment, the superabrasive mixture includes a glass powder that includes at least one member selected from a group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO). The abrasive grit of the superabrasive mixture includes a diamond particulate having a number average particle size in a range of between about 0.5 microns and about 60 microns, and wherein the mass ratio of the superabrasive to glass particles is in a range of between about 3:2 and about 1:99. The binder includes at least one member selected from a group consisting of polyethylene glycol, water, a mixture of polyethylene glycol and water and colloidal silica. The silicon carbide of superabrasive mixtures in the form of particles having a number average particle size in a range of between about 0.1 microns and about 20 microns, wherein the silicon carbide is present in the mixture in an amount in a range of between about 0.1 and about 5 volume percent of the total amount of glass powder, abrasive grit, binder and silicon carbide components of the mixture. In one embodiment, the superabrasive mixture is a green body precursor to a vitrified superabrasive product.

A method of forming a vitrified superabrasive product of the invention includes forming a green body that includes a glass powder, a superabrasive grit, a binder and silicon carbide. The green body is fired under an atmosphere and pressure, and at a temperature sufficient to form a porous vitrified superabrasive structure.

The green body, or superabrasive mixture, employed in forming the vitrified superabrasive product, has the features described above with respect to the superabrasive mixture or green body embodiments of the invention. A superabrasive mixture of the invention is formed by combining the components of the mixture in a suitable manner, such as is known in the art. A green body of the invention can be formed from the mixture, also by a suitable method, such as is known in the art. The green body typically is fired under an atmosphere at a temperature in a range of between about 600° C. and 820° C. for a period of time in a range of between about one-half hour and about ten hours. The fired product is then allowed to cool by a suitable method, such as by naturally-cooling of the furnace, to thereby form the superabrasive product of the invention.

The invention is further described by the following examples which are not intended to be limiting.

EXEMPLIFICATION

A high porosity vitrified diamond superabrasive structure of the invention was made by firing a mixture of a superabrasive grain, a glass frit, a binder and a silicon carbide powder. A mixture of the abrasive grain, glass fit and silicon carbide was prepared first and then, binder was added to it. The composition of the mixture in volume percentage, before firing, was: 19% diamond, 80% glass fit, 1% of SiC. Polyethylene glycol in water (PEG) solution was used as binder and it was used in 15 mass percentage of the above mix. The polyethylene glycol was purchased from Union Carbide Corporation, USA. Diamond of grit size 1-2 micron was obtained from Diamond Innovation, Inc, OH, USA. Glass frit used composed of following oxides: $Al_2O_3$, $B_2O_3$, BaO, CaO, $Fe_2O_3$, $K_2O$, $Li_2O$, MgO, $Na_2O$, $SiO_2$, ZnO and $ZrO_2$.

SiC of 1200 grit was used and it was obtained from Saint-Gobain Ceramics & Plastics, Inc., Worcester, Mass. USA.

All the components of the mixture except PEG were weighed in a steel bowl to obtain the above-described superabrasive mixture. A steel spoon was used to blend all powder components of the mixture until a visually homogeneous mix was obtained. The blend was then screened three times through a 165 mesh stainless steel mesh. (Generally, the mesh size can range from about 40 to about 400 mesh.) Binder was added to the mixture in the amount specified above. The mixture was again spoon blended until all the binder was integrated into it. The mixture was screened once using a 20 mesh stainless screen mesh to obtain granules. (Generally, the mesh size can range from about 4 to about 60 mesh (stainless).) These granules were spread on wax paper and left to dry for one day. (Generally, the range can be from about 1 hour to about 3 days.) After the drying, granules were screened using a 16 mesh screen. (Generally, the mesh range can be from about 4 to about 60 mesh.)

The theoretical density of the final mixture was calculated using information on their proportion in the mixture. This information was used to obtain the weight of the granules needed to make a disc 5" in diameter (Generally, the range can be from about 1" to about 10") and 0.200" height (Generally, the range can be from about 0.100" to about 5"). To make the green body for firing, dried granules were weighed and transferred into a stainless steel mould 5.00" in diameter and leveled using a small steel plate. The whole mould setup was now transferred onto a cold isostatic press. A pressure of 1 Ton/in$^2$ was applied to yield a green body. (Generally, the range can be from about 0.1 to about 10 Ton/in$^2$.)

This green body was transferred into a furnace and following firing schedule was applied: 5° C./min ramp to 550° C. from room temperature, soak for 60 min at 550° C., 5° C./min ramp to 700° C., soak for 240 min at 700° C. and the naturally cool down in the furnace. The furnace atmosphere was air. Example of other suitable alternatives include nitrogen, vacuum and argon. (Also, generally, the range of temperature can be from 600° C. to about 820° C., and the time for firing can be from about 0.1 hours to about 10 hours.

The resulting superabrasive product had essentially no pores having a diameter greater than 250 µm. About 80% of the pores had a diameter in a range of between about 100 µm and 200 µm, and the average aspect ratio of the pores was less than about 1.2. Porosity of the superabrasive product was estimated to be in a range of between about 62% and about 68%.

In other embodiments, essentially no bubbles will be larger than about 800 µm, or no larger than about 500 µm. Further, in preferred embodiments, about 80% of the bubbles will have diameters in a range of between about 60 µm and about 500 µm, or between about 80 µm and about 300 µm. In still other embodiments, about 80% will have a diameter between about 150 µm and about 250 µm, or between about 200 µm and about 300 µm. Further, in preferred embodiments the average aspect ratio (largest:smallest diameter) of the pores is no greater than about 1.5, or no greater than about 1.3. Still further, in another embodiment, the porosity is between about 50% and about 90%, or between about 60% and about 74%.

The fired body was dome-shaped. It was lapped into a disc shape to easily cut out segments for making a superabrasive wheel. A speedfame double sided lap unit was employed for lapping. The lap unit used 280/400 grit SiC for lapping. The lapped plate was cut into segments using a waterjet cutting machine. These segments were mounted on a 5" wheel using glue to make a superabrasive wheel of the invention. A second wheel was then made to the same specification.

The wheels were tested on a backgrinding machine (Disco 840 machine). The wheel was dressed using an extra-fine pad. The wheels were used to grind 8 inch silicon wafers. The silicon wafers were rough ground with a rough wheel followed by fine wheel—the same specification mentioned above. Three different incremental feed rates were used to evaluate the grinding performances. All the feed rates are listed in the table.

| Numbers | Feed rates in microns/second | Current in Amps |
|---------|------------------------------|-----------------|
| 1 | 0.2, 0.1, 0.1 | 5.5-6.1 |
| 2 | 0.3, 0.2, 0.2 | 7.1-7.3 |
| 3 | 0.5, 0.3, 0.2 | 8.4-8.6 |

Both the wheels drew current in the comparable range at all the feed rates. During the first and second tests, 25 wafers and 75 wafers were ground, respectively.

EQUIVALENTS

While this invention has been particularly shown and described with reference to preferred embodiments thereof, it will be understood by those skilled in the art that various changes in form and details may be made therein without departing from the scope of the invention encompassed by the pending claims.

What is claimed is:

1. A method of forming a vitrified superabrasive product, the method comprising:
   providing a mixture including a glass powder, a suberabrasive grit, and silicon carbide; and
   heating the mixture such that the silicon carbide is oxidized and acts as a foaming agent to form pores of the vitrified superabrasive product.

2. The method of claim 1, further comprising forming a green body that includes the glass powder, the superabrasive grit, and the silicon carbide.

3. The method of claim 2, wherein the green body includes a binder.

4. The method of claim 1, wherein the mixture is heated at a temperature in a range of between about 600° C. to 820° C.

5. The method of claim 1, wherein the mixture is heated for a period of time in a range of about one-half hour to about 10 hours.

6. The method of claim 1, wherein heating the mixture produces a fired product and the method further comprises cooling the fired product to form the vitrified superabrasive product.

7. The method of claim 1, wherein the superabrasive grit includes a diamond particulate.

8. The method of claim 1, wherein the superabrasive grit has an average particle size in a range of between about 0.5 μm and about 60 μm.

9. The method of claim 1, wherein a volume ratio of superabrasive grit to glass powder is in a range of between about 3:2 and about 1:99.

10. The method of claim 1, wherein the silicon carbide is present in the form of particles having a number average particle size in a range of between about 0.1 microns and about 20 microns.

11. The method of claim 3, wherein the silicon carbide is present in the mixture in an amount in a range of between about 0.1 and about 5 volume percent of the total amount of glass powder, abrasive grit, binder and silicon carbide components of the mixture.

12. The method of claim 1, wherein the glass powder includes at least one member selected from the group consisting of silicon dioxide ($SiO_2$), boron oxide ($B_2O_3$), aluminum oxide ($Al_2O_3$), alkali oxides ($Li_2O$, $Na_2O$, $K_2O$) and alkaline earth oxides (CaO, MgO, BaO).

13. The method of claim 3, wherein the binder includes at least one member selected from the group consisting of polyethylene glycol, water, a mixture of polyethylene glycol and water and colloidal silica.

* * * * *